(12) United States Patent
Grund et al.

(10) Patent No.: US 8,051,416 B2
(45) Date of Patent: Nov. 1, 2011

(54) METHOD FOR A USER-SPECIFIC CONFIGURATION OF A COMPUTER FROM A GROUP OF PREPARED COMPUTERS

(75) Inventors: Berthold Grund, Bobingen (DE); Dieter Reinersmann, Hemhofen (DE); Franz Schmidt, Offingen (DE); Monika Teslinski, Esplanade Brighton (AU)

(73) Assignee: Fujitsu Siemens Computers GmbH, Munich (DE)

( * ) Notice: Subject to any disclaimer, the term of this patent is extended or adjusted under 35 U.S.C. 154(b) by 1430 days.

(21) Appl. No.: 11/540,962

(22) Filed: Oct. 2, 2006

(65) Prior Publication Data
US 2007/0168473 A1    Jul. 19, 2007

Related U.S. Application Data

(63) Continuation of application No. PCT/DE2004/002104, filed on Sep. 22, 2004.

(30) Foreign Application Priority Data

Mar. 31, 2004 (DE) .......................... 10 2004 015 834

(51) Int. Cl.
*G06F 9/44* (2006.01)
(52) U.S. Cl. ........ 717/172; 717/103; 717/169; 717/171; 717/173; 717/177; 709/201; 709/218
(58) Field of Classification Search ........................ None
See application file for complete search history.

(56) References Cited

U.S. PATENT DOCUMENTS

| | | | | |
|---|---|---|---|---|
| 5,319,751 A | * | 6/1994 | Garney | 711/115 |
| 5,367,686 A | * | 11/1994 | Fisher et al. | 717/174 |
| 5,680,547 A | * | 10/1997 | Chang | 709/222 |
| 5,717,930 A | * | 2/1998 | Imai et al. | 717/176 |
| 5,787,246 A | * | 7/1998 | Lichtman et al. | 709/220 |
| 5,903,753 A | * | 5/1999 | Bramnick et al. | 719/328 |
| 5,933,647 A | * | 8/1999 | Aronberg et al. | 717/178 |
| 5,978,590 A | * | 11/1999 | Imai et al. | 717/177 |
| 5,996,073 A | * | 11/1999 | Lee et al. | 713/1 |
| 6,026,438 A | * | 2/2000 | Piazza et al. | 709/221 |

(Continued)

FOREIGN PATENT DOCUMENTS

EP        0793170 A1      9/1997

(Continued)

OTHER PUBLICATIONS

Title: Graceful Quorum Reconfiguration in a Robust Emulation of Shared Memory, author: Englert et al, source: IEEE, dated: Aug. 6, 2002.*

(Continued)

*Primary Examiner* — Chemeli Das
(74) *Attorney, Agent, or Firm* — Edell, Shapiro & Finnan, LLC

(57) ABSTRACT

Installation and configuration of user-specific software and a computer system is performed such that individual computers in a group is prepared by transmitting the installation packages for a predetermined set of software products and a configuration program to the individual computers. In response to a computer being started for the first time, the configuration program loads a user-specific configuration file from a database system. According to the information contained in the configuration file, software products are subsequently installed and configured on the computer on a user-specific basis using the installation packages.

18 Claims, 1 Drawing Sheet

U.S. PATENT DOCUMENTS

| | | | |
|---|---|---|---|
| 6,066,182 A * | 5/2000 | Wilde et al. | 717/175 |
| 6,278,449 B1 * | 8/2001 | Sugiarto et al. | 715/826 |
| 6,606,744 B1 * | 8/2003 | Mikurak | 717/174 |
| 6,615,166 B1 * | 9/2003 | Guheen et al. | 703/27 |
| 7,016,962 B2 * | 3/2006 | Hertling et al. | 709/227 |
| 7,107,589 B1 * | 9/2006 | Tal et al. | 717/177 |
| 7,213,232 B1 * | 5/2007 | Knowles | 717/121 |
| 7,620,711 B2 * | 11/2009 | Boese et al. | 709/223 |
| 7,653,687 B2 * | 1/2010 | Reisman | 709/203 |
| 2002/0004935 A1 * | 1/2002 | Huotari et al. | 717/11 |
| 2002/0013831 A1 * | 1/2002 | Astala et al. | 709/220 |
| 2002/0124245 A1 * | 9/2002 | Maddux et al. | 717/176 |
| 2003/0046682 A1 | 3/2003 | Crespo et al. | |
| 2004/0139178 A1 * | 7/2004 | Mendez et al. | 709/220 |
| 2004/0148460 A1 * | 7/2004 | Steinmetz et al. | 711/114 |
| 2004/0203295 A1 * | 10/2004 | Hadba et al. | 439/894 |
| 2007/0103984 A1 * | 5/2007 | Kavuri et al. | 365/185.17 |
| 2010/0064104 A1 * | 3/2010 | Steinmetz et al. | 711/114 |

FOREIGN PATENT DOCUMENTS

| | | |
|---|---|---|
| WO | WO 01/73543 A2 | 10/2001 |
| WO | WO 03/052596 A1 | 6/2003 |

OTHER PUBLICATIONS

Title: Configuration Language Support for software Installation, author: Sommerville et al, source: IEEE< dated: Mar. 21, 1994.*

"Preinstalling Microsoft Windows XP by Using the OEM Preinstallation Kit, Part 1" Windows Platform Design Notes, Apr. 4, 2003, XP002301441.

* cited by examiner

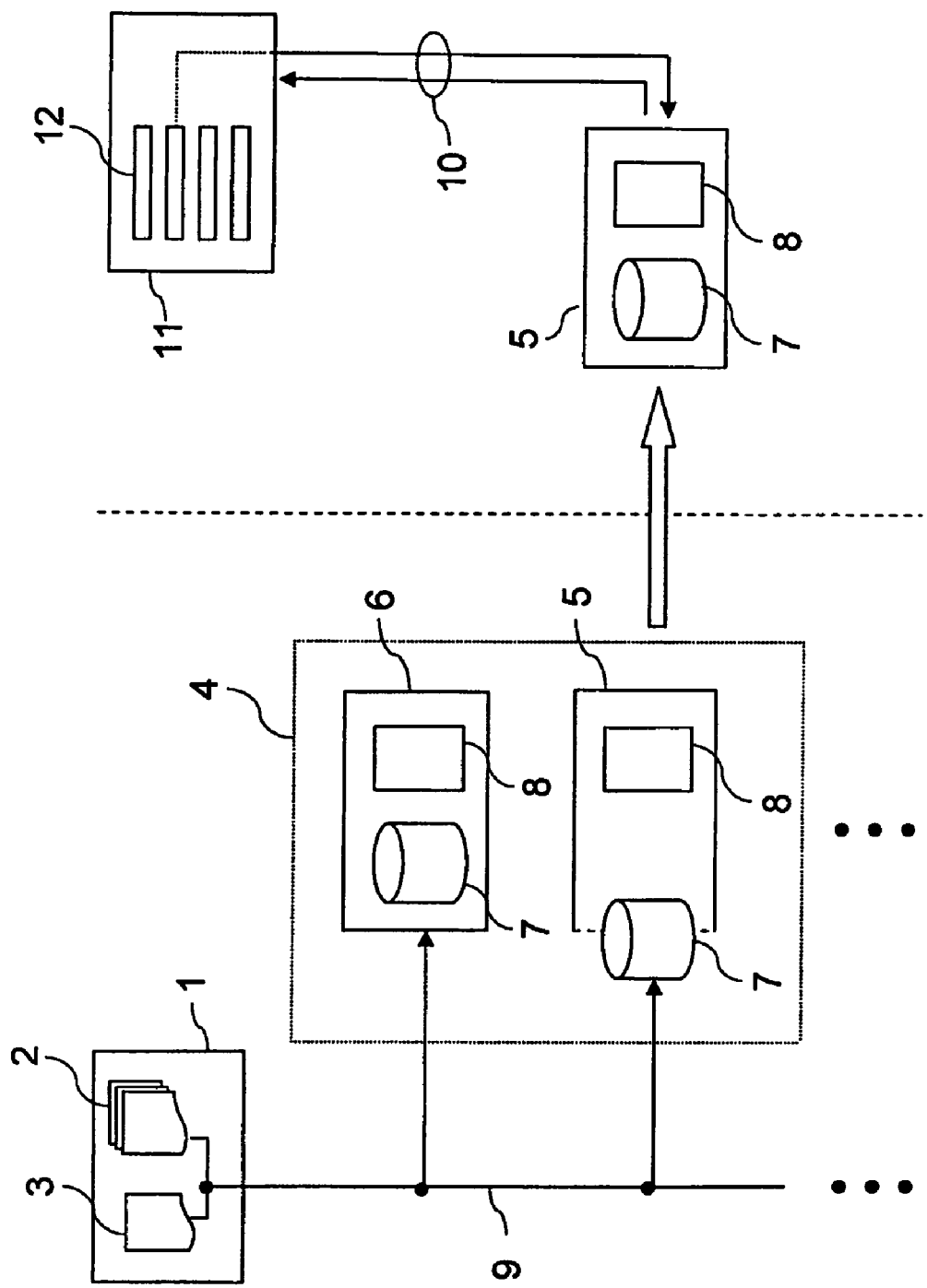

METHOD FOR A USER-SPECIFIC CONFIGURATION OF A COMPUTER FROM A GROUP OF PREPARED COMPUTERS

CROSS REFERENCE TO RELATED APPLICATIONS

This application is a continuation of International Application No. PCT/DE2004/002104, filed on Sep. 22, 2004, entitled "Method for a User-Specific Configuration of a Computer from a Group of Prepared Computers," which claims priority under 35 U.S.C. §119 to Application No. DE102004015834.7 filed on Mar. 31, 2004, entitled "Method for a User-Specific Configuration of a Computer from a Group of Prepared Computers," the entire contents of which are hereby incorporated by reference.

BACKGROUND

Methods for user-specific configurations of computers are used, in particular, when a large number of computers are intended to be newly used in a working environment or are intended to be replaced. In this case, a working environment is, for example, a company or an institution which may comprise a plurality of sites.

The full set of software products used within the working environment is referred to below as a software pool. Only a selection of the software products in the software pool is typically installed on the individual computers at individual workstations within the working environment. In addition, the software products installed are frequently configured on a user-specific basis. An example which may be mentioned is a program for sending e-mails which, in addition to the user name, must be informed of the e-mail address, a signature and the protocol being used. Settings of the operating system likewise are provided on a user-specific basis; for example, the address of the nearest network printer needs to be specified or the network drives to be included need to be mentioned.

The following three methods are known, inter alia, for a user-specific configuration of computers within a working environment.

New computers or computers to be replaced can be set up on site without additional preparation. A selection of software from the software pool is then installed manually and on site using installation media, for example CDs or DVDs, followed by the subsequent configuration of the operating system and the software products. This procedure of single-terminal installation is not practical where a relatively large number of computers is to be set up. Additionally, single-terminal installation blocks the workstation on site for the entire duration of the set up and configuration of the new computer.

A second method likewise involves setting up the computers on site without any additional preparation but then allowing installation and configuration to take place via a network, the data for installing the software products also being transmitted via the network. Since installation and configuration are centrally controlled via the network, this method is associated with a considerably lower personnel requirement.

The document US 2003/0046682 A1 describes network installation which comprises automatic initial installation and additional subsequent installation operations which makes it possible to centrally record the installation progress and to store the latter for documentation and backup purposes.

Such network installation is less susceptible to errors and is more economical than single-terminal installation. One disadvantage of this method is that a large volume of data must be transmitted via the network. This is problematic, in particular, when a large number of computers is intended to be installed simultaneously or the network has only a narrow transmission bandwidth. By way of example, this type of installation is prohibited for external locations of a working environment which are connected to the network via telephone lines.

A third possibility is for the supplier to individually install and configure the corresponding software products on each computer. The computer is only then set up on site. In this case, the outlay is lowest on site but this gives rise to great logistic problems at the supplier's premises since each computer has to be individually packaged and sent.

SUMMARY

A method is described which achieves a user-specific software installation and configuration of a computer system which can be performed in a rapid and practical manner even with a large number of computers or where there are network connections having a narrow bandwidth. In particular, the described method relates to the installation and configuration of user-specific software and computer system which can be performed in a rapid and practical manner even with a large number of computers or with network connections having a narrow bandwidth. According to the method, the installation and configuration of user-specific software and computer system is performed such that:

each computer in the group is prepared by transmitting all of the installation packages for a predetermined set of software products, i.e., software pool, and a configuration program to the mass memory of the computer;
  a database system containing user-specific configuration files is provided, the configuration files mentioning a subselection of software products from the predetermined set and, if appropriate, specifying a list of parameters needed for the user-specific configuration of the software products;
  the user-specific configuration file is transmitted to the configuration program; and
  the configuration program installs the software products mentioned in the configuration file using the installation packages and, if appropriate, configures them using the specified parameters.

A very high data transmission rate can be realized when transmitting the installation packages while preparing the computers so-called refueling stations. The method uses this high data rate and combines it with the flexibility of network installation. The set of software products which is used overall within a working environment typically has a clear size. The data rate at which the installation packages can be transmitted to the mass memories, for example the hard disks, of the computers while preparing the computers is, at data rates up to 150 Mbyte/s, approximately 120 times higher than typical network data rates, e.g., 10 Mbit/s, more than 10 times higher than the data rates in conventional fast networks, e.g., 100 Mbit/s, and even higher than the data rates in so-called gigabit networks, e.g., 1000 MBit/s. A larger volume of data than in other methods is transmitted in the described method since the computers are also provided with those installation packages which are not needed afterward during user-specific configuration. Nevertheless, the time expenditure is lower overall and is additionally incurred outside the actual working environment, thus representing an additional advantage for the user.

The above and still further features and advantages of the described method will become apparent upon consideration of the following definitions, descriptions and descriptive figures of specific embodiments thereof. While these descriptions go into specific details of the described method, it should be understood that variations may and do exist and would be apparent to those skilled in the art based on the descriptions herein.

BRIEF DESCRIPTION OF THE DRAWINGS

The method is explained in more detail below with reference to exemplary embodiments, where:

FIG. 1 diagrammatically shows an exemplary embodiment of the described method.

DETAILED DESCRIPTION

The left-hand side of FIG. 1 illustrates a preparation station 1 which has the installation packages 2 for the predetermined one set of software products and a configuration program 3. A computer 5 and a computer 6 are shown, by way of example, from a group of computers 4, each computer having a mass memory 7 and a network device 8. The mass memories 7 of the computers 5 and 6 are connected to the preparation station 1 via a data line having a high data rate 9.

The right-hand side of FIG. 1 illustrates the computer 5 on site where it is connected, by way of its network device 8, to a database system 11 containing configuration files 12 via a network connection 10.

In order to prepare the group of computers 4, the installation packages 2 and the configuration program 3 are compiled in the preparation station 1. The computers 5 and 6 are then connected to the preparation station 1 via the data line having a high data transmission rate 9. The installation packages 2 and the configuration program 3 are then transmitted to the mass memories 7 of the computers 5 and 6.

The computers 5 and 6 can be connected, and the data can be transmitted, in different ways. On the one hand, as illustrated in the case of the computer 6, contact can be made with external interfaces. Such an interface may also be the network device 8, for example. On the other hand, it is conceivable, as illustrated in the case of the computer 5, to remove the mass memory 7 from the computer 5 for a short time and to use the mass memory's own interface to transmit data. In this case, such interfaces, for example SCSI (Small Computer System Interface) or parallel or serial ATA (Advanced Technology Attachment), have the highest data rates of up to 133 Mbyte/s (parallel ATA) or 150 Mbyte/s (serial ATA) and are the preferred solution. In another embodiment, data can be transmitted using optical mass memories and corresponding data storage media such as CDs or DVDs instead of the data line having a high data rate 9 between the preparation station 1 and the group of computers 4.

After this preparation step, the individual computers in the group of computers 4 are transferred to their locations within the working environment. Since the computers are not yet different, on a user-specific basis, at this point in time, there is no need to assign a computer to a particular location or user and distribution may be effected in an arbitrary manner.

As shown in the right-hand part of FIG. 1, the network device 8 of the computer 5 is connected to the database system 11 via the network connection 10 after the computer has been set up at its location. The configuration program 3 is contained in the mass memory 7 of the computer 5 and is set up in such a manner that it automatically starts when the computer 5 is switched on. The configuration program 3 then asks the user to input his user identifier. The database system 11 is informed of this user identifier via the network device 8 and the network connection 10. A configuration file 12 is stored in the database system 11 for each valid user identifier, the configuration file then being transmitted back from the database system 11 to the computer 5 and the configuration program 3 via the network connection 10. The configuration file 12 contains the names of the software products which are intended to be installed on the computer 5 for the corresponding user in accordance with his user identifier. In addition, there is, if appropriate, a list of parameters which are needed for the user-specific configuration of the installed software products. These may be, for example, the e-mail address, the protocol being used or a signature for a program for sending e-mails; they may be particular text format models for a text processing program and may be, for example, the network address of the database being used for a database program. The parameter lists may likewise contain settings and values for configuring the operating system. In this case, one example which could be mentioned would be the name and address of network drives or the location, name and address of network printers.

The configuration program 3 then uses the information contained in the configuration file 12 to install and configure the subselection of software products on the computer 5 with the aid of the installation packages 2. The amount of information which must be transmitted in the configuration file 12 for this purpose using the network connection 10 is only a fraction of the quantity of data in the installation packages 2. The configuration files 12 can be transmitted without any problems even in the case of a network connection 10 having only a low data transmission rate. This also applies when a large number of computers are simultaneously retrieving the configuration files 12 from the database system 11.

In one embodiment of the method according to the described device, after the software products mentioned in the configuration file 12 have been successfully installed, the configuration program 3 erases all of the installation packages 2 from the mass memory 7 of the computer 5. The configuration program 3 then changes its setting in such a manner that it no longer automatically starts after the computer 5 has been switched on or it erases itself from the mass memory 7 of the computer 5.

In another embodiment, the configuration program 3 is designed in such a manner that, after the software products mentioned in the configuration file 12 have been installed, the installation packages 2 for these installed software products alone are removed from the mass memory 7 of the computer 5.

In this case, the configuration program 3 may also be designed in such a manner that, upon each further start of the computer 5, it again uses the network device 8 and the network connection 10 to make contact with the database system 11. If the database system 11 contains an updated version of the configuration file 12, the latter is transmitted back to the computer 5 and the configuration program 3. The configuration program 3 can then subsequently install software products which are mentioned in the newer version of the configuration file 12 and have hitherto not yet been installed and, if appropriate, can configure them using specified parameters, or can use new parameters to reconfigure software products which are mentioned and have already been installed, or can uninstall software products which are not mentioned in the configuration file and have already been installed. Therefore, the method according to the described device is not only suitable for the initial installation and configuration of a computer but can also be used to reconfigure the computer.

In another embodiment, a portable data storage medium, for example a floppy disk or CD, can be used, instead of the network connection 10, to transmit the user-specific configuration file 12 from the database system 11 to the computer 5. Combination solutions are also correspondingly possible within a working environment such that all of the computers which have a network connection 10 are provided with the configuration file 12 via the network connection. In contrast, computers, for example in external locations, which do not have a network connection, are provided with the configuration file 12 using the portable data storage medium.

Within each working environment, there will be a subset of the set of software products used overall, which subset can be found again during each user-specific installation. Such a set typically includes e-mail programs, text processing programs and an Internet browser. In such a case, it is possible to install these programs on all of the computers as early as in the preparation step. All other software products are transmitted to the mass memories 7, as usual, in the form of installation packages 2. The data can be transmitted in the form of individual files. It is likewise possible to transmit a complete replica of a mass memory 7 in the form of a so-called image file.

If the computer 5 replaces a computer that has previously been used by the user, a further embodiment of the method according to the described device involves settings from the previous computer also being included in the configuration file 12. In the event that the setting from the previous computer are known to the database system 11 in the form of backup files, for example, the database system 11 can automatically add this setting to the configuration files 12. Settings for which such a method would be possible would be, e.g., the bookmarks of an Internet browser which the user has collected over time.

While the described device has been described in detail with reference to specific embodiments thereof, it will be apparent to one of ordinary skill in the art that various changes and modifications can be made therein without departing from the spirit and scope thereof. Accordingly, it is intended that the present described device covers the modifications and variations of this described device provided they come within the scope of the appended claims and their equivalents.

LIST OF REFERENCE SIGNS

1 Preparation station
2 Installation packages
3 Configuration program
4 Group of computers
5, 6 Computers
7 Mass memory
8 Network device
9 Data line having a high data rate
10 Network connection
11 Database system
12 Configuration file

What is claimed is:

1. A method for generating a user-specific configuration of an individual computer from a group of computers, each computer respectively comprising a mass memory and a network device, the method comprising:
preparing the group of computers by transmitting all installation packages for a first predetermined set of software products and a configuration program to the mass memory of each computer in the group;
providing a database system containing user-specific configuration files, the user-specific configuration files specifying a subselection of software products from the first predetermined set;
after preparing the group of computers, transferring the individual computer from the group of computers to a location within a working environment and setting up the individual computer at the location;
transmitting the user-specific configuration file to the configuration program of the individual computer; and
installing the subselection of software products specified in the user-specific configuration file via the configuration program on the individual computer using the installation packages stored on the mass memory of the individual computer.

2. The method as claimed in claim 1, further comprising:
specifying a list of parameters needed to configure the subselection of software products; and
configuring the subselection of software products using the specified list of parameters.

3. The method as claimed in claim 1, further comprising:
establishing, via the configuration program, a connection to the database system using the network device of the individual computer;
requesting a user for a user identifier and forwarding the user identifier from the individual computer to the database system; and
transmitting the user-specific configuration file to the configuration program in the individual computer via the network device and the database system, in response to the database system receiving the user identifier.

4. The method as claimed in claim 1, wherein the user-specific configuration file is transmitted by the database system via a portable data storage medium, the method further comprising:
requesting, via the configuration program, a user to insert the portable data storage medium; and
retrieving, via the configuration program, the user-specific configuration file from the portable data storage medium.

5. The method as claimed in claim 1, wherein the configuration program automatically starts after the individual computer has been switched on.

6. The method as claimed in claim 5, wherein the configuration program changes its settings, after executing for a first time on the individual computer, such that the configuration program no longer automatically starts on the individual computer.

7. The method as claimed in claim 1, wherein the configuration program removes all of the installation packages from the mass memory of the individual computer after the software products specified in the user-specific configuration file have been installed on the individual computer.

8. The method as claimed in claim 1, wherein the configuration program removes the installation packages for the software products specified in the user-specific configuration file from the mass memory of the individual computer after the software products specified in the user-specific configuration file have been installed on the individual computer.

9. The method as claimed in claim 1, wherein the configuration program is erased from the mass memory of the individual computer after the software products specified in the user-specific configuration file have been installed on the individual computer.

10. The method as claimed in claim 1, further comprising:
upon each further start of the individual computer, establishing a connection to the central database system via the network device of the individual computer and automatically transmitting to the database system the user identifier used during a first start of the individual computer;

transmitting any newer version of the user-specific configuration file from the database system to the configuration program on the individual computer;

installing on the individual computer the software products specified in the newer version of the user-specific configuration file that have not yet been installed and configuring the software products using specified parameters;

using the installation packages and newly specified parameters to reconfigure the software products that are specified in the newer version of the user-specific configuration file and that have already been installed on the individual computer; and uninstalling the software products on the individual computer that are not specified in the newer version of the user-specific configuration file and that have already been installed.

11. The method as claimed in claim 1, wherein preparing the group of computers includes preinstalling on each computer a second predetermined set of software products intended to be installed during each user-specific configuration and not transmitting the second predetermined set of software products to the mass memory of each computer in the form of installation packages.

12. The method as claimed in claim 11, wherein the second predetermined set of software products are preinstalled via transmitting a replica of an installed system to the mass memory of each computer in the group.

13. The method as claimed in claim 1, wherein preparing the group of computers includes connecting each computer in the group to a preparation station via a data line having a high data rate, wherein the installation packages and the configuration program are transmitted to the mass memory of each computer via the data line.

14. The method as claimed in claim 13, wherein the data line comprises one of an external interface of the network device, an interface of the mass storage device, a Small Computer System Interface (SCSI) interface, a parallel Advanced Technology Attachment (ATA) interface, and a serial ATA interface.

15. The method as claimed in claim 1, wherein preparing the group of computers includes transmitting the installation packages and the configuration program using optical mass memories and corresponding data storage media to each computer in the group.

16. A computer system comprising:
a mass memory configured to store installation packages for all software products of a predetermined set of software products and a configuration program; and
a network device configured to connect the computer system via a network connection with a database system;
wherein the installation program is configured to:
request a user to enter an identification after the computer system has been transferred from a group of similarly prepared computers to a location within a working environment and has been set-up at the location within a working environment;
transmit the user identification via the network device and the network connection to the database system;
receive a user-specific configuration file from the database system via the network connection in response to the transmission of the user identification, the user-specific configuration file specifying a subselection of software products from the predetermined set; and
install the subselection of software products specified in the user-specific configuration file on the computer system using the installation packages stored on the mass memory of the computer system.

17. The computer system as claimed in claim 16, wherein the computer system is configured to automatically start the configuration program after the computer system has been switched on.

18. A non-transitory computer readable medium storing a configuration program for a user-specific configuration of an individual computer, the individual computer comprising a network device and a mass memory, the mass memory storing installation packages for all software products of a predetermined set of software products and the configuration program, wherein the configuration program, when executed by the individual computer, causes the individual computer to perform the functions of:
requesting a user to input an identification after the individual computer has been transferred from a group of similarly prepared computers to a location within a working environment and has been set-up at the location within a working environment;
transmitting the user identification via the network device to a database system over a network connection;
receiving a user-specific configuration file from the database system via the network connection in response to the transmission of the user identification, the user-specific configuration file specifying a subselection of software products from the predetermined set; and
installing the subselection of software products specified in the user-specific configuration file on the individual computer using the installation packages stored on the mass memory of the individual computer.

* * * * *